(12) United States Patent
Kopp et al.

(10) Patent No.: US 7,082,836 B2
(45) Date of Patent: Aug. 1, 2006

(54) PRESSURE AVERAGER

(75) Inventors: Thomas Kopp, Wolfach (DE); Jörn Jacob, Wolfach (DE)

(73) Assignee: Vega Grieshaber KG, Wolfach (DE)

( * ) Notice: Subject to any disclaimer, the term of this patent is extended or adjusted under 35 U.S.C. 154(b) by 40 days.

(21) Appl. No.: 10/886,261

(22) Filed: Jul. 7, 2004

(65) Prior Publication Data

US 2005/0028599 A1 Feb. 10, 2005

(30) Foreign Application Priority Data

Aug. 7, 2003 (DE) ................. 103 36 914

(51) Int. Cl.
*G01L 7/08* (2006.01)
(52) U.S. Cl. ......................... 73/715; 137/111
(58) Field of Classification Search ............... 73/700, 73/715, 706; 137/111, 112
See application file for complete search history.

(56) References Cited

U.S. PATENT DOCUMENTS 5,983,726 A    11/1999   Heller

FOREIGN PATENT DOCUMENTS

| DE | 39 16 689 C1 | 9/1990 |
|----|----|----|
| DE | 100 36 433 A1 | 2/2002 |
| DE | 100 49 996 A1 | 4/2002 |
| DE | 101 37 327 A1 | 2/2003 |
| DE | 101 48 859 A1 | 4/2003 |
| DE | 101 62 044 A1 | 6/2003 |
| EP | 0 427 261 B1 | 5/1991 |
| EP | 1 126 260 A1 | 8/2001 |

*Primary Examiner*—Edward Lefkowitz
*Assistant Examiner*—Andre Allen
(74) *Attorney, Agent, or Firm*—Nath & Associates PLLC; Gregory B. Kang; Stanley N. Protigal

(57) ABSTRACT

The invention is relative to pressure averagers (1), especially flange pressure averagers, with a base body (10) and a separating membrane (5) that is fastened to a side (14) of the base body (10) in a fastening area (6) for the separating membrane (5) and that can be loaded from the outside with a pressure. At least one recess (9) is advantageously formed in the base body (10) on the side of the fastening area (6) of the separating membrane (5), wherein at least one recess (9) in the base body (10) is dimensioned (t, b) in such a manner that tensions deforming the base body (10) are not transferred or are transferred only in a reduced state onto the fastening area (6). It can also be additionally or alternatively provided that the fastening area (6) for the separating membrane (5) and the separating membrane (5) are arranged in the area of a tension plane (n) of the base body (10) and that an at least reduced tension occurs in the area of the tension plane (n) under the bending tension.

18 Claims, 2 Drawing Sheets

PRESSURE AVERAGER

The invention is relative to a pressure averager with, especially a flange pressure averager, with a base body and a separating membrane fastened to a side of the base body in a fastening area for the separating membrane that can be loaded from the outside with a pressure.

Typical pressure-measuring devices consist of a pressure averager and of an actual pressure sensor coupled to the pressure averager. The pressure-measuring device is loaded by the pressure averager from the outside via a present medium with a pressure to be measured. The pressure averager is a hydraulic system that transfers the pressure to be measured via an elastic separating membrane onto a pressure transfer liquid and via the pressure transfer liquid onto the coupled sensor element. The separating membrane is fastened to the base body in a fastening area facing the medium and a chamber with the pressure transfer liquid is formed between the wall of the base body and the separating membrane.

In a so-called flange pressure averager the separating membrane is fastened, as a rule welded directly onto the side facing the process or medium to be measured. The base body has a flange in the circumferential area at the side of the separating membrane. This flange comprises several bores via which the flange can be fastened by a screw connection to a corresponding counterpiece. During the assembly on a counterpiece as a coupled, other structural element, a seal, e.g., a flat seal or an O-ring seal is inserted between the flange or base body and the counterpiece and the seal surrounds the fastening area of the separating membrane. When the screw connection located, from the viewpoint of the separating membrane, on the other side of the seal is tightened, forces that can be significant in some instances are exerted on the flange as a function of the applied torque and the screw connection elements used. These forces deform and, in particular, bend the flange and the entire base body. The forces bending the base body are also active in the fastening area of the separating membrane and are thus transferred onto the separating membrane so that it is deflected. The deflection of the separating membrane generates a corresponding pressure change in the pressure transfer medium. However, such a pressure change in the pressure transfer medium, conditioned by the assembly, constitutes an undesired measuring error that can typically amount to up to 20 mbar and more. Since the clamping forces can change via temperature changes, additional temperature errors result that cannot be compensated. Moreover, this assembly effect also has a negative effect on the long-time stability of the pressure-measuring device since the clamping forces do not remain constant due, e.g., to a settlement behavior of the seal between flange and counterpiece.

The invention has the problem of making a pressure averager available with which the assembly-conditioned assembly errors are reduced by the action of tension.

This problem is solved by a pressure averager with the features of claim 1 or by a pressure averager with the features of claim 9 or by a pressure averager with the features of claim 16.

Advantageous embodiments constitute subject matter of dependent claims.

A pressure averager, especially a flange pressure averager, with a base body and a separating membrane fastened to a side of the base body in a fastening area for the separating membrane and that can be loaded from the outside with a pressure to be measured, is advantageously formed by at least one recess in the base body on the side of at least a part of the fastening area of the separating membrane. The at least one recess in the base body is advantageously dimensioned in such a manner that the forces deforming the base body are not transferred or are transferred only in a reduced state onto the separating membrane.

The fastening area for the separating membrane and a tensioning area for the assembly of the pressure averager on a counterpiece are decoupled by the recess at least in the surface area of the base body as regards the tensions acting during assembly on the base body. The recess is thus advantageously formed between at least one part of the fastening area of the separating membrane and between the tension areas for clamping the pressure averager on the counterpiece.

The recess advantageously surrounds the entire fastening area, especially circumferentially, and runs in the case of customary circular separating membranes as an annular groove from the surface of the base body into the latter.

The deeper the bottom of the recess is, the lesser is the influence of the tensions acting on the recess side on the base body and bending it as regards the fastening area of the separating membrane decoupled by the recess. The recess is therefore advantageously designed to be as deep as a chamber bottom of a chamber with a pressure transfer liquid below the separating membrane or deeper than the chamber bottom. According to the especially preferred embodiment, the depth of the recess bottom is as deep or deeper than the side of the separating membrane facing the base body or the chamber. In particular, a formation of a recess that is deeper than the chamber bottom also reduces a bending of the chamber wall and the chamber bottom, which would finally also bring about a change of pressure in the pressure transfer liquid.

In the especially preferred embodiment, the fastening area is designed in the form of a particularly narrow web. The first investigations show that a recess depth is advantageously greater than a width of the web, in which instance a preferred factor of depth to width is greater than or equal to 2. The forming of the web from an elastic material is also advantageous and leads to a further reduction of the action of tensions acting on the base body.

In the preferred embodiment in accordance with this concept, the course of tension in the area of the fastening of the separating membrane is therefore interrupted by a recess, in particular a circumferential groove. As a result thereof, forces occurring in the area of the membrane fastening are reduced. It is especially advantageous if the recess is arranged very tightly on the clamping area of the membrane so that a resilient elastic web is formed in cup-shaped membrane contours via which web the introduction of force is further reduced.

According to a second concept with independent inventive content and that can also be advantageously combined with the previous concept, a start is again made from a pressure averager, especially a flange pressure averager with a base body and a separating membrane that is fastened on a side of the base body in a fastening area and that can be loaded from the outside with a pressure. The base body again directly or indirectly comprises an assembly arrangement that results when fastening the pressure averager onto another structural element or counterpiece in a tension that bends the base body. A reduction or neutralization of tension regarding the separating membrane and its fastening area can be advantageously achieved in that the fastening area for the separating membrane and the separating membrane are arranged in the area of a tension plane of the base body, in which instance a tension that is opposite at least an adjacent assembly surface of the base body occurs under the bending force in the area of the tension plane and the separating membrane and said tension is at least distinctly reduced in comparison to a tension that would result if the separating membrane were arranged on the surface of the base body. Thus, a setting back of the pressure averager membrane or of its fastening area into the area of a so-called neutral seam or plane describing a neutral tension course within the bent base body takes place. The fact is made use of that during the clamping of the base body or flange to the membrane side, pressure tension occurs and on the opposite side of the base body traction tension occurs, wherewith a tension-neutral zone or the so-called neutral seam is present between the two opposing sides of the base body that are loaded with opposite tensions. This neutral zone which is tension-free or at least tension-reduced, is normally located approximately in the middle of the base body and in the case of a base body with a flange thickness that is reduced in comparison to the thickness of the base body in a correspondingly offset area. If the membrane fastening is located in the area of the neutral seam, no tensions are introduced into the separating membrane so that, also, no changes of pressure in the pressure transfer medium occur via deformation of the membrane.

Accordingly, the arrangement is advantageously selected in such a manner that the reduced tension is a minimal tension in the bent base body. The fastening area for the separating membrane and the separating membrane are correspondingly arranged in a recess of the base body that has a depth corresponding to the tension forces present for shifting the fastening area into a sufficient depth. The recess accordingly forms the contact area with respect to a medium to be loaded with pressure. In the setting back of the separating membrane and/or of the fastening area for the separating membrane into a tension-neutral zone, a shifting into a deep zone can also be carried out that is not optimum as such for the separating membrane but that, at the same time, takes into account any occurring deformation of the chamber wall adjacent to the separating membrane that can likewise lead to a variation of pressure of the pressure transfer liquid between the chamber bottom and the separating membrane.

The depth of the recess is advantageously selected to be a function of a ratio of the dimension of the separating membrane to the amount of bending of the base body in order to make possible an operation of the separating membrane that is tension-reduced, especially tension-free as regards the bending.

A third solution of the initially cited problem provides that the base body comprise two parallel surfaces and that the separating membrane and its fastening area on the base body be arranged offset at least approximately by 1/10 the thickness of the base body from one of the two surfaces back into the base body.

The offset is preferably at least approximately 1/5 the thickness of the base body.

It is especially preferable to provide that the separating membrane and its fastening area be arranged at least approximately in the middle of the base body. In this instance, the base body together with the separating membrane has a cup shape on the whole.

In order to achieve optimal results, a combination of the three solutions posed is also possible. First experiments show a reduction of the assembly effect to a pressure difference of less than 0.1 mbar caused as a consequence, so that the residual error can be considered negligible in customary applications.

Advantages are produced by a minimal assembly effect since the accuracy is independent of the tightening moment of the flange screws. Also, no additional temperature errors result from temperature-dependent pre-tensioning forces and an improved longtime stability also results as regards, e.g., material properties that vary in time. On the whole, an increased measuring accuracy occurs.

Exemplary embodiments are explained in detail in the following, with reference made to the drawings.

Figure 1:
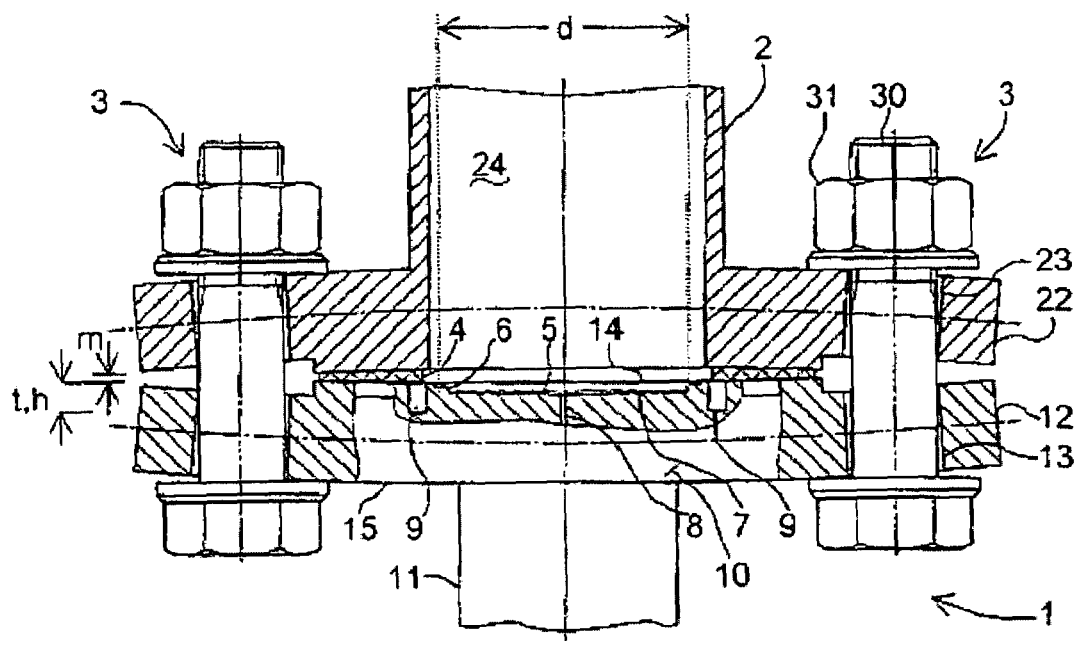
FIG. 1 shows a partial sectional view through a pressure averager in accordance with a first exemplary embodiment.

As is apparent from FIG. 1, a pressure averager 1 of a pressure-measuring device is shown that is connected under tension to counterpiece 2 as another structural element via a screw connection as a fastening arrangement or assembly arrangement 3. Pressure averager 1 comprises base body 10 from which connection pipe 11 runs to a pressure sensor. The lateral circumferential edge of base body 10 is designed as flange 12 and a connection via a separate flange extending over the circumferential edge of base body 10 or also other alternative fastening arrangement elements can be made. One or more flange bores 13 runs through flange 12 through which a screw connection consisting of screw 30 and nut 31 runs. The shaft of screw 30 runs further through flange bore 23 formed in opposite flange 22 of counterpiece 2. Flange 12 of pressure averager 1 and flange 22 of the counterpiece are braced against one another via the screw head, the screw shaft of screw 30, and nut 31. Counterpiece 2 has central passage opening 24 for the medium, whose pressure or pressure difference is to be measured with the aid of the pressure-measuring device with interpositioning of pressure averager 1. Passage opening 24 in counterpiece 2 runs to the central area of side 14 of base body 10 facing counterpiece 2.

At least one seal 4, e.g., an annular sealing disk or an O-ring seal is arranged between, on the one hand, the central area of this side 14 of base body 10 and passage opening 24 of counterpiece 2 on the opposite side and, on the other hand, fastening arrangement 3 in the circumferential area of base body 10 and counterpiece 2. As a result of the bracing of base body 10 and counterpiece 2 in their circumferential area beyond seal 4, a tension running through base body 10 builds up that concavely bends base body 10 relative to counterpiece 2, as the drawing shows. Side 14 of base body 10 facing counterpiece 2 is buckled thereby while opposite side 15 of base body 10 is subjected to a tearing tension or expansion.

Separating membrane 5 is located in the control area of side 14 of base body 10 opposite passage opening 24 of counterpiece 2 as a pressure averager membrane and the circumferential area of separating membrane 5 is fastened in fastening area 6 for the separating membrane on base body 10. Separating membrane 5 has a direct operative connection with the medium in passage opening 24 of counterpiece 2. Chamber 7 is formed underneath separating membrane 5, that is, in the direction of the adjacent wall of base body 10. This chamber communicates with a pressure sensor of the pressure-measuring device via a bore or line 8. Chamber 7 and line 8 are filled with a pressure averager medium or a pressure transfer liquid. A pressure or a pressure difference of the medium in passage opening 24 thus acts via separating membrane 5 on the pressure averager medium in chamber 7 while the pressure averager medium passes the pressure or pressure difference onto the pressure sensor.

Thus, a variation of such known pressure averagers with a separating membrane 5 as pressure averager membrane via a chamber with a chamber bottom as overload bed is described in which the separating membrane is fastened in its circumferential area by a known membrane joining by means of, e.g., adhering, soldering or welding to fastening area 6 of base body 10.

In principle, the tension that bends base body 10 would also have a buckling effect on the central area of side 14 of base body 10 and therewith via fastening area 6 for the separating membrane on separating membrane 5. In order to avoid the transfer of tension, separating [sic; fastening] area 6 for separating membrane 5 is interrupted by recess 9 running from the surface of side 14 of base body 10 into base body 10.

In the case of a bracing of pressure averager 1 and counterpiece 2 with, e.g., only two opposing fastening arrangements 3, the formation of two separate recesses 9 running transversely between the central area with fastening area 6 for separating membrane 5 and the particular adjacent fastening arrangement 3 would be sufficient in principle. However, in the case of a concentric arrangement of pressure averager 1, counterpiece 2 and separating membrane 5, a concentric recess 9 in the form of a concentric a groove is preferred.

In the exemplary embodiment shown in FIG. 1, the depth of recess 9 relative to the surface of base body 10 is selected to be distinctly deeper than depth t of membrane 5 and of the bottom of chamber 7 relative to the surface of base body 10. Furthermore, fastening area 6 for separating membrane 5 has a width equal to or greater than width b of recess 9. The dimensioning of the circumferential groove with regard to width b and depth t as well as the dimensioning of fastening area 6 for separating membrane 5 with regard to its width bs and interval to recess 9 are suitably selected, preferably in accordance with the embodiment of pressure averager 1, as well as of the materials of pressure averager 1, counterpiece 2 and seal 4 used, as well as their embodiment.

Figure 2:
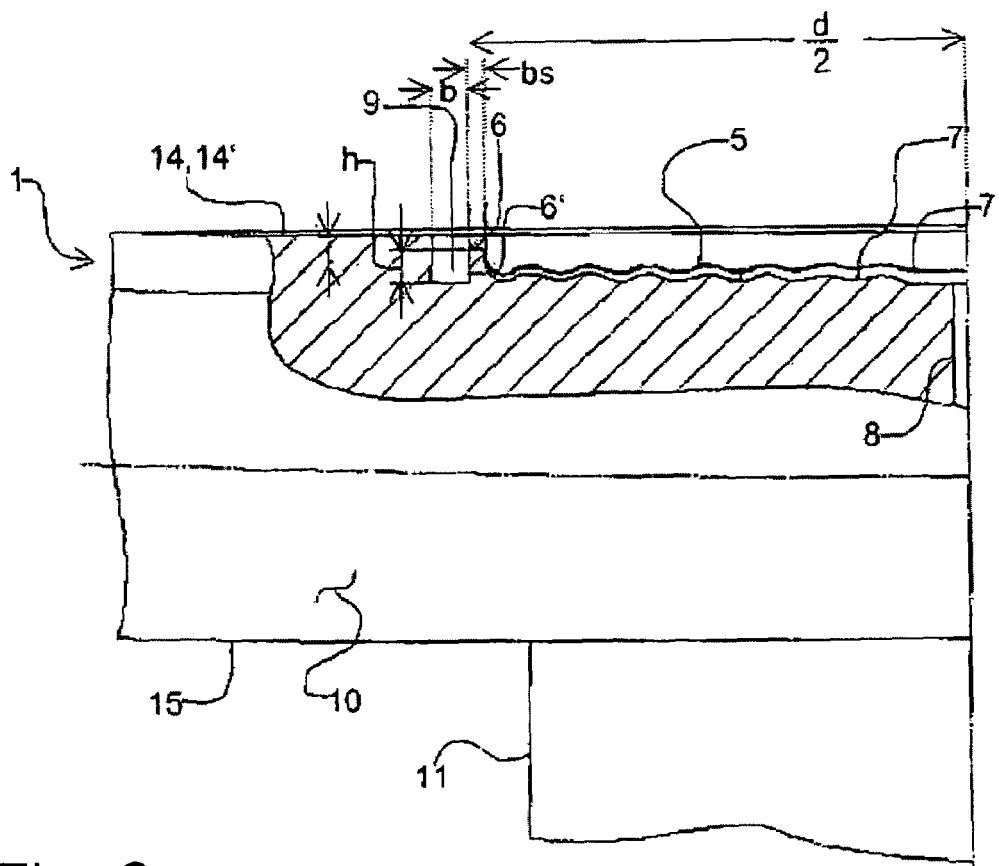
FIG. 2 shows a sectional enlargement in accordance with an embodiment that has been varied in contrast to the previous one.

FIG. 2 shows a preferred alternative embodiment of the embodiment of the first exemplary embodiment shown in FIG. 1. Corresponding reference numerals are used for the same or comparable structural elements. In addition, for the sake of simplification, primarily, components and functions are described that have not already been described in the present exemplary embodiment.

Separating membrane 5 is shown again and is arranged on side 14 of base body 10 in its surface area 14'. Fastening area 6 for separating membrane 5 is designed as an integral component of base body 10 and, as an alternative, a web can also be fastened as an independent structural element onto the surface of base body 10. Recess 9 has a depth t in the embodiment shown that corresponds relative to surface 14' of base body 10 to depth t of chamber bottom 7' of chamber 7. Fastening area 6 for fastening separating membrane 5 has a height h above the bottom of recess 9 that is lower than depth t of recess 9. In the embodiment shown, fastening area 6 for separating membrane 5 is formed by narrow web 6' and the width bs of web 6' is preferably narrower than width b of recess 9. In the preferred exemplary embodiment, width bs of web 6' is at least half as large as width b of the recess. Web 6' preferably consists of a resilient elastic material, which results in a further reduction of any acting tensions.

Figure 3:
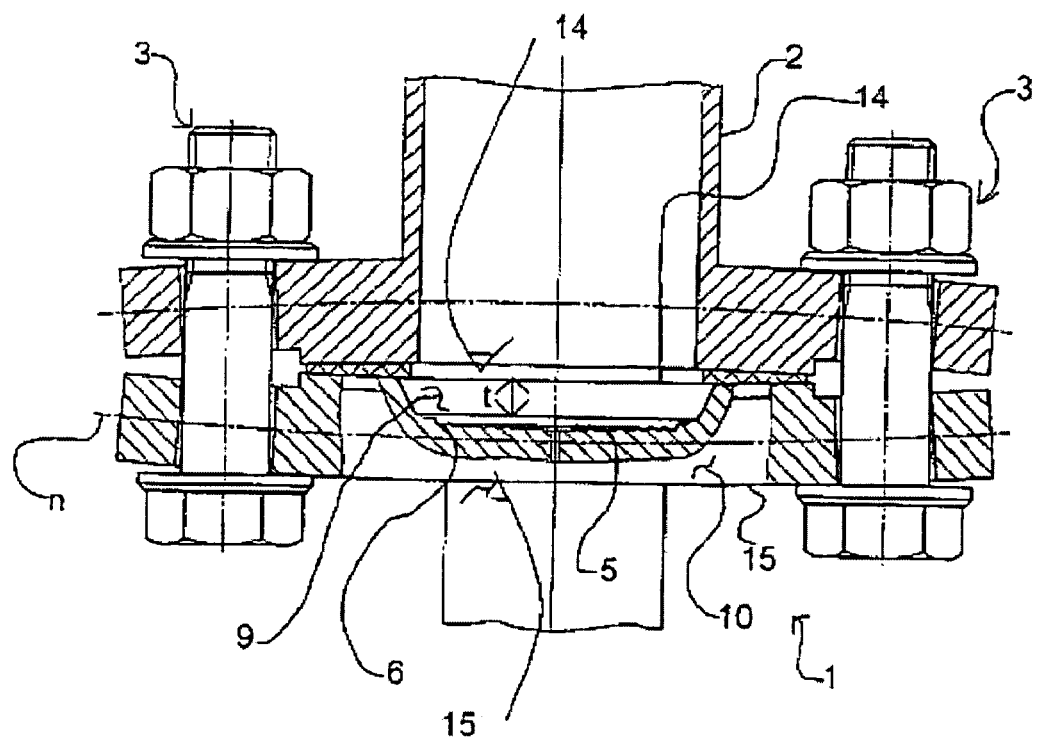
FIG. 3 shows a partial sectional view through a pressure averager in accordance with a second exemplary embodiment.

FIG. 3 shows a second exemplary embodiment in which reference is again made to previous embodiments for reference numerals of individual components in case of identity or similarity of the components.

In the pressure averager shown, a recess 9' is introduced into base body 10 from its side 14 that faces counterpiece 2. Recess 9' comprises fastening area 6 for separating membrane 5 in its bottom area. Fastening area 6 for separating membrane 5 is shifted by this arrangement together with separating membrane 5 into base body 10. Recess 9' has a depth t that is selected in such a manner that fastening area 6 for separating membrane and separating membrane 5 are shifted into a tension area of base body 10 in which a compressing tension in the area of side 14 of the base body facing counterpiece 2 and an expanding tension in the area of opposite side 15 of base body 10 cancel one another out to the extent possible or totally. A seam n or neutral tension plane that is called neutral in regard to the tension acting in base body 10 is indicated by a dotted line. Depth t of recess 9' is preferably fixed taking into account a plurality of other parameters that take into account the course of tension in base body 10 as well as the strength of base body 10 reduced by recess 9' and the like.

Figure 4:
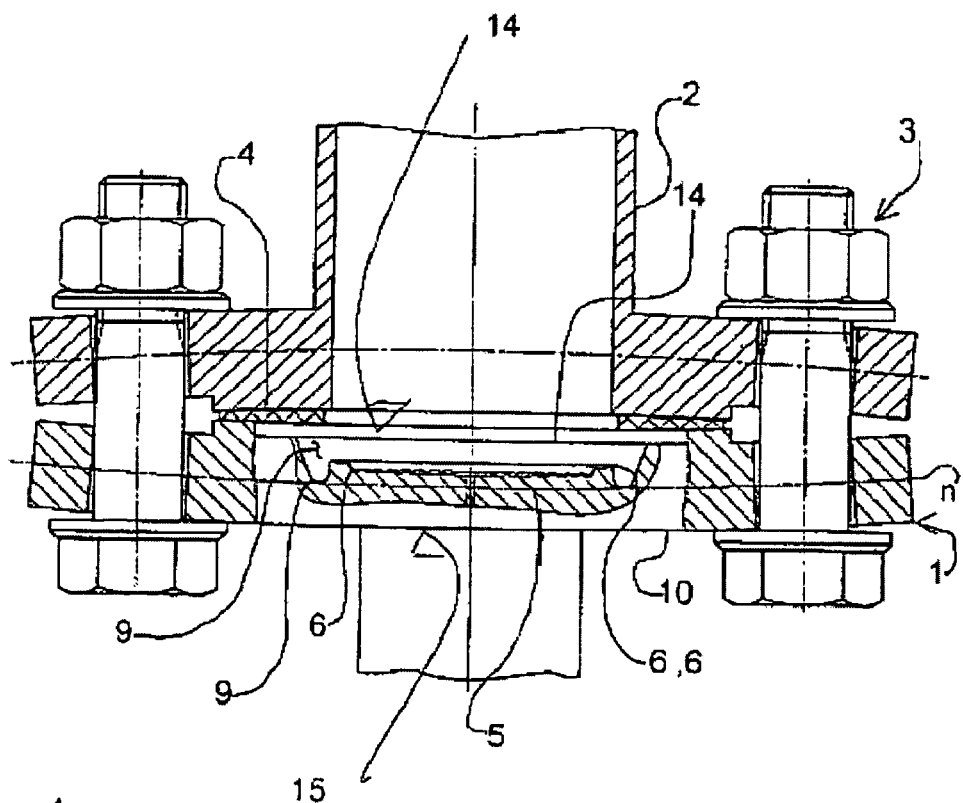
FIG. 4 shows a partial sectional view through a third embodiment representing a combination of the two exemplary embodiments.

FIG. 4 shows an exemplary embodiment in which the exemplary embodiments and embodiments of the previously described pressure averagers are combined in order to achieve an even more improved reduction of tension. Reference is made to the previous embodiments regarding the description of components and functions and the use of the same reference numerals.

It shows recess 9' extending from upper surface 14' of side 14 of base body 10 into base body 10 facing counterpiece 2. Fastening area 6' for separating membrane 5 is again shifted relative to surface 14' of base body 10 in the direction of seam or plane n, which that is neutral as regards acting fastening tensions. In addition, groove-shaped recess 9 running deeper into base body 10 runs from the bottom area of recess 9' along the side of fastening area 6 for separating membrane 5. In the exemplary embodiment shown, the circumferential groove extends as a further recess 9 up to the area of neutral plane n. Note for the sake of completion that the lower surface of base body 10 has the reference numeral 15'.

The individually described elements can be advantageously combined in manifold ways. In particular, width bs and height h of the web as well as depth t of recesses 9 can be varied. Remaining deformations of the chamber bottom or the lateral chamber walls of chamber 7 due to tensions acting on base body 10, which in the final analysis also have an effect on the pressure averager medium inside chamber 7, can also be taken into consideration. Furthermore, material, shape and dimensioning of seal 4, e.g., also its thickness or depth m, which is inserted between pressure averager 1 or its base body 10 and counterpiece 2 and also results in a bracing of base body 10 when pressure averager 1 and counterpiece 2 are assembled together, can be taken into consideration. Diameter d of the separating membrane is also advantageously taken into consideration regarding the recess dimension.

LIST OF REFERENCE NUMERALS

1 Pressure averager
2 Counterpiece
3 Fastening arrangement/screw connection
4 Seal
5 Separating membrane
6 Fastening area for 5
6' Web
7 Chamber with pressure averager medium
8 Line from 7 to a pressure sensor
9, 9' Recesses
10 Base body of 1
11 Pipe/offtake from 1
12 Flange on 1
13 Flange-bore in 12
14 Side of 10 in direction 2
14' First surface of base body 10
15 Side opposite 14
15' Second surface of base body 10
22 Flange on 2
23 Flange-bore in 22
24 Passage opening for medium in 2 to be measured for pressure
t Depth of 9
b Width of 9
bs Width of 6, 6'
n Neutral seam/plane
m Thickness of 4
d Diameter of 5

The invention claimed is:

1. A pressure averager (1), especially a flange pressure averager, with a base body (10) and a separating membrane (5) fastened to a side (14) of the base body (10) in a fastening area (6) for the separating membrane (5) that can be loaded from the outside with a pressure, characterized by at least one recess (9) in the base body (10) on the side of at least a part of the fastening area (6) of the separating membrane (5), whereby at least one recess (9) in the base body (10) is dimensioned (t, b) in such a manner that tensions deforming the base body (10) are not transferred or are transferred only in a reduced state onto the fastening area (6) and/or the separating membrane (5), in which the fastening area (6) for the separating membrane (5) is formed by a web, in particular a narrow web (6').

2. The pressure averager according to claim 1, in which the recess (9) surrounds the fastening area (6) for the separating membrane (5).

3. The pressure averager according to claim 1, in which a bottom of the recess (9) is as deep or deeper than the side of the separating membrane (5) facing the base body (10).

4. The pressure averager according to claim 1, in which a bottom of the recess (9) is as deep or deeper than a chamber bottom (7') of a chamber (7) below the separating membrane (5).

5. The pressure averager according to claim 1, in which the depth (t) of the recess (9) is greater than a width (bs) of the web (6').

6. The pressure averager according to claim 5, in which a factor of the depth (t) of the recess (9) or of a height (h) of the web (6') from the bottom of the recess (9) relative to the width (bs) of the web (6') is greater than or equal to 2.

7. The pressure averager according to claim 1, in which the web (6') is constructed from an elastic material.

8. A pressure averager (1), especially a flange pressure averager, with a base body (10) and a separating membrane (5) fastened to a side (14) of the base body (10) in a fastening area (6) for the separating membrane (5) that can be loaded from the outside with a pressure, characterized by at least one recess (9) in the base body (10) on the side of at least a part of the fastening area (6) of the separating membrane (5), whereby at least one recess (9) in the base body (10) is dimensioned (t.b) in such a manner that tensions deforming the base body (10) are not transferred or are transferred only in a reduced state onto the fastening area (6) and/or the separating membrane (5), a base body (10), a separating membrane (5) that is fastened to a side (14) of the base body (10) in a fastening area (6) for the separating membrane (5) and that can be loaded from the outside with a pressure, and with an assembly arrangement (3) that bends the base body (10) during the fastening of the pressure averager (1) to a counterpiece (2) under tension, characterized in that the fastening area (6) for the separating membrane (5) and/or the separating membrane (5) is/are arranged in the area of a tension plane (n) of the base body (10), wherein a distinctly reduced tension occurs in the area of the tension plane (n) and the separating membrane under the bending force in comparison to a tension that would result if the separating membrane (5) were arranged on the surface (14') of the base body (10).

9. The pressure averager according to claim 8, in which the area of the reduced tension in the bent base body (10) is an area of a minimal tension.

10. The pressure averager according to claim 8, in which the fastening area (6) for the separating membrane (5) and the separating membrane (5) are arranged in a recess (9') of the base body (10) at a depth (t).

11. The pressure averager according to claim 10, in which the recess (9') forms a contact area to a medium to be loaded with pressure from the counterpiece (2).

12. A pressure averager (1), especially a flange pressure averager, with a base body (10) and a separating membrane (5) fastened to a side (14) of the base body (10) in a fastening area (6) for the separating membrane (5) that can be loaded from the outside with a pressure, characterized by at least one recess (9) in the base body (10) on the side of at least a part of the fastening area (6) of the separating membrane (5), whereby at least one recess (9) in the base body (10) is dimensioned (t,b) in such a manner that tensions deforming the base body (10) are not transferred or are transferred only in a reduced state onto the fastening area (6) and/or the separating membrane (5), with an assembly arrangement (3), especially a flange (12), for fastening the pressure averager (1) to the counterpiece (2) in such a manner that the side (14) of the base body (10) with the separating membrane (5) faces the counterpiece (2), wherein the base body is braced in a concavely bent manner relative to the counterpiece (2) during the assembly by means of the assembly arrangement (3).

13. The pressure averager according to claim 2, in which the depth (t) of the recess (9,9') is selected to be a function of a ratio of the dimension (d) of the separating membrane (5) to the amount of bending of the base body (10) in order to make possible an operation of the separating membrane (5) that is tension-reduced, especially tension-free as regards the bending.

14. The pressure averager according to claim 12, in which the base body (10) comprises the separating membrane (5) on the side (14) facing the counterpiece (2), a seal (4) is inserted laterally relative to at least two sides of the separating membrane (5) between the base body (10) and the counterpiece (2), and the assembly arrangement (3) braces the base body (10) and the counterpiece (2) to one another beyond the seal (4) from the viewpoint of the separating membrane (5).

15. A pressure averager (1), especially a flange pressure averager, with a base body (10) and a separating membrane (5) fastened to a side (14) of the base body (10) in a fastening area (6) for the separating membrane (5) that can be loaded from the outside with a pressure, characterized by at least one recess (9) in the base body (10) on the side of at least a part of the fastening area (6) of the separating membrane (5), whereby at least one recess (9) in the base body (10) is dimensioned (t,b) in such a manner that tensions deforming the base body (10) are not transferred or are transferred only in a reduced state onto the fastening area (6) and/or the separating membrane (5), characterized in that the base body (10) comprises two parallel surfaces (14',15') and that the separating membrane (5) and its fastening area (6) on the base body (10) are arranged offset at least approximately by 1/10 the thickness of the base body (10) from one of the two surfaces (14',15') back into the base body (10).

16. The pressure averager according to claim 15, characterized in that the offset is preferably at least approximately ⅕ the thickness of the base body (10).

17. The pressure averager according to claim 15, characterized in that the separating membrane (5) and its fastening area (6) are arranged at least approximately in the middle of the base body (10).

18. The pressure averager according to claim 15, characterized in that the base body (10) together with the separating membrane (5) has a cup shape.

* * * * *

UNITED STATES PATENT AND TRADEMARK OFFICE
CERTIFICATE OF CORRECTION

PATENT NO. : 7,082,836 B2 Page 1 of 1
APPLICATION NO. : 10/886261
DATED : August 1, 2006
INVENTOR(S) : Kopp et al.

It is certified that error appears in the above-identified patent and that said Letters Patent is hereby corrected as shown below:

Claim 8, Column 8, Line 6,
Please delete
"(t.b)" and replace with -- (t,b) --

Signed and Sealed this

Seventh Day of November, 2006

JON W. DUDAS
*Director of the United States Patent and Trademark Office*